(12) United States Patent
Kulik et al.

(10) Patent No.: US 9,074,897 B2
(45) Date of Patent: Jul. 7, 2015

(54) REAL-TIME DATA WITH POST-PROCESSING

(75) Inventors: Victor Kulik, San Jose, CA (US);
Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 12/484,913

(22) Filed: Jun. 15, 2009

(65) Prior Publication Data

US 2010/0318292 A1 Dec. 16, 2010

(51) Int. Cl.
*G01C 21/00* (2006.01)
*G01C 21/16* (2006.01)
*G01S 19/47* (2010.01)
*G01S 19/49* (2010.01)

(52) U.S. Cl.
CPC .............. *G01C 21/165* (2013.01); *G01S 19/47* (2013.01); *G01S 19/49* (2013.01)

(58) Field of Classification Search
None
See application file for complete search history.

(56) References Cited

U.S. PATENT DOCUMENTS

| | | | |
|---|---|---|---|
| 5,452,211 A | 9/1995 | Kyrtsos et al. | |
| 5,663,734 A | 9/1997 | Krasner | |
| 5,774,829 A | 6/1998 | Cisneros et al. | |
| 5,862,511 A * | 1/1999 | Croyle et al. | 701/445 |
| 5,874,914 A | 2/1999 | Krasner | |
| 5,883,594 A | 3/1999 | Lau | |
| 5,884,220 A | 3/1999 | Farmer et al. | |
| 5,983,159 A | 11/1999 | Schipper | |
| 5,999,124 A | 12/1999 | Sheynblat | |
| 6,016,119 A | 1/2000 | Krasner | |
| 6,055,477 A * | 4/2000 | McBurney et al. | 701/469 |
| 6,104,340 A | 8/2000 | Krasner | |
| 6,246,960 B1 | 6/2001 | Lin | |
| 6,252,543 B1 | 6/2001 | Camp | |
| 6,259,398 B1 | 7/2001 | Riley | |
| 6,285,316 B1 | 9/2001 | Nir et al. | |
| 6,295,024 B1 | 9/2001 | King et al. | |
| 6,424,914 B1 * | 7/2002 | Lin | 701/470 |
| 6,429,809 B1 | 8/2002 | Vayanos et al. | |
| 6,433,739 B1 | 8/2002 | Soliman | |
| 6,490,456 B1 | 12/2002 | Bogdan et al. | |
| 6,493,631 B1 * | 12/2002 | Burns | 701/472 |
| 6,535,833 B1 | 3/2003 | Syrjarinne | |
| 6,570,530 B2 | 5/2003 | Gaal et al. | |
| 6,587,692 B1 | 7/2003 | Chen et al. | |

(Continued)

FOREIGN PATENT DOCUMENTS

BY 6664 C1 12/2004
CN 1152356 A 6/1997

(Continued)

OTHER PUBLICATIONS

Buck T M, et al., "A High G, MEMS Based, Deeply Integrated, INS/GPS, Guidance, Navigation and Control Flight Management Unit" Position, Location, and Navigation Symposium, 2006 IEEE/ ION COR0NAD0, CA Apr. 25-27, 2006, Piscataway, NJ, USA,IEEE LNKDDOI: 10.1109/PLANS.2006.1650674, Apr. 25, 2006, pp. 772- 794, XP010925000 ISBN: 978-0-7803-9454-4.

(Continued)

*Primary Examiner* — Jonathan M Dager
(74) *Attorney, Agent, or Firm* — Linda Gunderson; Michael R. Johnson

(57) ABSTRACT

The subject matter disclosed herein relates to determining and/or predicting a navigation solution.

53 Claims, 3 Drawing Sheets

(56) References Cited

U.S. PATENT DOCUMENTS

| | | | |
|---|---|---|---|
| 6,664,923 B1 | 12/2003 | Ford | |
| 6,735,523 B1* | 5/2004 | Lin et al. | 701/470 |
| 6,975,266 B2 | 12/2005 | Abraham et al. | |
| 7,409,289 B2* | 8/2008 | Coatantiec et al. | 701/472 |
| 7,586,441 B2* | 9/2009 | Huang et al. | 342/357.66 |
| 7,613,917 B1 | 11/2009 | Chojnacki | |
| 7,623,871 B2 | 11/2009 | Sheynblat | |
| 7,646,330 B2 | 1/2010 | Karr | |
| 7,987,049 B2* | 7/2011 | Hayashi et al. | 701/472 |
| 8,614,641 B2* | 12/2013 | Yule et al. | 342/357.28 |
| 2001/0020216 A1* | 9/2001 | Lin | 701/216 |
| 2002/0015439 A1* | 2/2002 | Kohli et al. | 375/148 |
| 2002/0032525 A1 | 3/2002 | Yoshikawa et al. | |
| 2002/0047799 A1* | 4/2002 | Gustafson et al. | 342/357.12 |
| 2002/0089450 A1* | 7/2002 | Dowdle et al. | 342/453 |
| 2002/0120400 A1* | 8/2002 | Lin | 701/214 |
| 2002/0126044 A1* | 9/2002 | Gustafson et al. | 342/357.12 |
| 2003/0132878 A1* | 7/2003 | Devereux et al. | 342/357.06 |
| 2003/0146869 A1* | 8/2003 | Lin et al. | 342/357.14 |
| 2003/0149528 A1* | 8/2003 | Lin | 701/214 |
| 2004/0002344 A1 | 1/2004 | Moeglein et al. | |
| 2004/0025277 A1 | 2/2004 | Chen | |
| 2004/0145519 A1* | 7/2004 | Cho | 342/357.06 |
| 2005/0090266 A1 | 4/2005 | Sheynblat | |
| 2005/0162312 A1* | 7/2005 | Riday | 342/357.13 |
| 2005/0192745 A1 | 9/2005 | Abraham et al. | |
| 2005/0203701 A1* | 9/2005 | Scherzinger | 701/207 |
| 2005/0228589 A1 | 10/2005 | Diggelen et al. | |
| 2005/0288033 A1 | 12/2005 | McNew et al. | |
| 2006/0028377 A1 | 2/2006 | Abraham | |
| 2006/0071851 A1* | 4/2006 | Graas et al. | 342/357.14 |
| 2006/0293853 A1* | 12/2006 | Chiou et al. | 701/223 |
| 2007/0004430 A1 | 1/2007 | Hyun et al. | |
| 2007/0016371 A1* | 1/2007 | Waid et al. | 701/213 |
| 2007/0205941 A1* | 9/2007 | Riley et al. | 342/357.12 |
| 2008/0032706 A1 | 2/2008 | Sheynblat et al. | |
| 2008/0071469 A1 | 3/2008 | Caveney | 701/207 |
| 2008/0088507 A1* | 4/2008 | Smith et al. | 342/386 |
| 2008/0091350 A1* | 4/2008 | Smith et al. | 701/213 |
| 2008/0117100 A1* | 5/2008 | Wang et al. | 342/357.02 |
| 2008/0262728 A1* | 10/2008 | Lokshin et al. | 701/216 |
| 2008/0270026 A1* | 10/2008 | Han | 701/213 |
| 2008/0279421 A1* | 11/2008 | Hamza et al. | 382/103 |
| 2008/0284643 A1* | 11/2008 | Scherzinger et al. | 342/357.02 |
| 2009/0093959 A1* | 4/2009 | Scherzinger et al. | 701/216 |
| 2009/0287414 A1* | 11/2009 | Vickery | 701/220 |
| 2009/0315772 A1* | 12/2009 | Wengler et al. | 342/357.15 |
| 2009/0322598 A1* | 12/2009 | Fly et al. | 342/357.03 |
| 2010/0117894 A1* | 5/2010 | Velde et al. | 342/357.02 |
| 2010/0117897 A1* | 5/2010 | Riley et al. | 342/357.09 |
| 2010/0194634 A1* | 8/2010 | Biacs et al. | 342/357.09 |
| 2010/0312461 A1* | 12/2010 | Haynie et al. | 701/117 |
| 2011/0148697 A1* | 6/2011 | Thiel et al. | 342/357.26 |
| 2011/0163913 A1* | 7/2011 | Cohen et al. | 342/357.29 |
| 2011/0298658 A1* | 12/2011 | Riley et al. | 342/357.26 |
| 2012/0032842 A1* | 2/2012 | Smith et al. | 342/357.29 |
| 2012/0146847 A1* | 6/2012 | Janky et al. | 342/357.23 |
| 2013/0344901 A1* | 12/2013 | Garin et al. | 455/456.6 |
| 2014/0080514 A1* | 3/2014 | Das et al. | 455/456.1 |
| 2014/0225770 A1 | 8/2014 | Riley et al. | |

FOREIGN PATENT DOCUMENTS

| | | |
|---|---|---|
| CN | 1425226 A | 6/2003 |
| CN | 1893728 A | 1/2007 |
| EP | 1203966 A2 | 5/2002 |
| EP | 1455198 A2 | 9/2004 |
| EP | 1841256 A1 | 10/2007 |
| JP | 1298820 A | 12/1989 |
| JP | 10505723 | 6/1998 |
| JP | 2000028699 A | 1/2000 |
| JP | 2000184430 A | 6/2000 |
| JP | 2001083227 A | 3/2001 |
| JP | 2001177469 A | 6/2001 |
| JP | 2001508250 A | 6/2001 |
| JP | 2001305210 | 10/2001 |
| JP | 2003506690 A | 2/2003 |
| JP | 2004519887 A | 7/2004 |
| JP | 2005517340 A | 6/2005 |
| JP | 2005326225 A | 11/2005 |
| JP | 2006504110 | 2/2006 |
| JP | 2008506126 A | 2/2008 |
| JP | 2011128156 A | 6/2011 |
| KR | 20000007288 | 2/2000 |
| KR | 20070021872 A | 2/2007 |
| RU | 2182341 | 5/2002 |
| RU | 2235341 | 8/2004 |
| RU | 2253127 | 5/2005 |
| RU | 2004134213 | 6/2005 |
| TW | 448304 B | 8/2001 |
| TW | 200819774 A | 5/2008 |
| WO | WO9635958 A1 | 11/1996 |
| WO | WO-9718485 A1 | 5/1997 |
| WO | WO9815150 A1 | 4/1998 |
| WO | WO-9954752 | 10/1999 |
| WO | WO-0058748 A1 | 10/2000 |
| WO | WO02052225 | 7/2002 |
| WO | WO-02061450 | 8/2002 |
| WO | WO-02071095 | 9/2002 |
| WO | WO2004113948 | 12/2004 |
| WO | WO2005004528 A1 | 1/2005 |
| WO | WO-2006005193 A1 | 1/2006 |
| WO | WO-2006029277 A1 | 3/2006 |

OTHER PUBLICATIONS

International Search Report and Written Opinion—PCT/US2010/038678, International Search Authority—European Patent Office—Oct. 15, 2010.

Lee H-W, et al., "Self-regulated GPS navigation processor" Signal Processing Systems, 1998. SIPS 98. 1998 IEEE Workshop on Cambridge, MA, USA Oct. 8-10, 1998, New York, NY, USA,IEEE, US LNKD-DOI:10.1109/SIPS.1998.715795, Oct. 8, 1998, pp. 327-336, XP010303693 ISBN: 978-0-7803-4997-1.

Montenbruck O, et al., "Reduced dynamic orbit determination using GPS code and carrier measurements" Aerospace Science and Technology, Elsevier Masson, FR LNKDD0I: 10.1016/J.AST.2005.01. 003, vol. 9, No. 3, Apr. 1, 2005, pp. 261-271, XP025368000 ISSN: 1270-9638 [retrieved on Apr. 1, 2005] Sections 2.5, 2.6 figure 2.

Schmid, et al.: "Combined Galileo/GPS Architecture for Enhanced Sensitivity Reception," AEU International Journal of Electronics and Communications, Elsevier, Jena, DE, vol. 59, No. 5, Jul. 15, 2005, pp. 297-306.

Willms B: "Space integrated GPS/INS (SIGI) navigation system for space shuttle" Digital Avionics Systems Conference, 1999. Proceedings. 18th St Louis, M0, USA Oct. 24-29, 1999, Piscataway, NJ, USA,IEEE, US, vol. B.5/12 pp. vol. 2, Oct. 24, 1999, pp. 4-1, XP010366370 ISBN: 978-0-7803-5749-5.

U.S. Appl. No. 12/425,309, "Method for Position Determination with Measurement Stitching", Wyatt Thomas Riley et. al., filed Apr. 16, 2009, QUALCOMM, Incorporated.

Taiwan Search Report—TW099119538—TIPO—Apr. 22, 2013.

Mao et al., "Non-Linear GPS Models for Position Estimate Using Low-cost GPS Receiver", Intelligent Transportation Systems, Proceedings, IEEE, Oct. 12, 2003, vol. 1, pp. 637-642.

Taiwan Search Report—TW103105134—TIPO—Apr. 20, 2015.

* cited by examiner

REAL-TIME DATA WITH POST-PROCESSING

BACKGROUND

1. Field

The subject matter disclosed herein relates to determining and/or predicting a navigation solution.

2. Information

A satellite positioning system (SPS), such as the Global Positioning System (GPS), the Wide Area Augmentation System (WAAS), and a Global Satellite Navigation System (GNSS), for example, typically provides position, velocity, and/or time information. A variety of receivers have been designed to decode signals transmitted from satellite vehicles (SVs) of an SPS to determine position, velocity, and/or time. In general, to decipher such signals and compute a final position, a receiver may first acquire signals from SVs that are in view, measure and track the received signals, and recover navigational data from the signals. By accurately measuring distances or "pseudoranges" to multiple SVs, the receiver may triangulate its position, e.g., solving for a latitude, longitude, and/or altitude. In particular, the receiver may measure distance by measuring time required for signals to travel from a respective SV to the receiver.

In certain locations, such as urban environments with tall buildings, a receiver may only be able to acquire signals from three or less SVs. In such situations, the receiver may be unable to resolve all four variables of a position solution that include latitude, longitude, altitude, and time. If signals from fewer than four SVs are available, the receiver may be unable to calculate its position based on an SPS. To address such a limitation, receivers may employ hybrid location technology that involves signals from base stations of a wireless communication system, for example. As with SV signals, hybrid receivers may measure time delays of wireless signals to measure distances to base stations of a network. Hybrid receivers may utilize signals from base stations as well as any acquired signals from SPS SVs to resolve position and time variables. Such a hybrid positioning technique may allow a receiver to compute a position solution in a wide variety of locations where SPS-only positioning techniques may fail. In code division multiple access (CDMA) mobile wireless systems, for example, a base station measurement portion of a hybrid technique is referred to as Advanced Forward Link Trilateration (AFLT).

Accuracy of a position solution determined by a receiver may be affected by the degree of time precision within a positioning system. In synchronized systems, such as existing CDMA systems for example, timing information communicated by cellular base stations may be synchronized with timing information from SPS SVs, providing precise time throughout the system. In some systems, such as the Global System for Mobile Communications (GSM), timing information may not be synchronized between base stations and the SPS satellites. In such systems, Location Measurement Units (LMUs) may be added to an existing infrastructure to provide precise timing information for a wireless network.

Another technique that may be used in position determining systems is the use of Kalman filters. A Kalman filter (KF) may comprise a recursive data estimation algorithm for modeling attributes or states of moving entities such as aircraft, people, and vehicles, just to name a few examples. Such attributes or states may include velocity and/or position. A current state of a system and a current measurement may be used to estimate a new state of the system. A Kalman filter may combine available measurement data, prior knowledge about a system, measuring devices, and/or error statistics to produce an estimate of desired variables in such a manner that the error may be statistically minimized.

SUMMARY

In one particular implementation, a method may comprise processing signals representing information obtained in a first time period to obtain one or more measurements associated with the first time period, estimating and/or predicting a state following the first time period based, at least in part, on the one or more measurements associated with the first time period, obtaining signals representing additional information subsequent to the first time period, re-processing at least a portion of signals representing the information obtained in the first time period based, at least in part, on the additional information to obtain updates to the one or more measurements associated with the first time period, and re-estimating and/or re-predicting the state based, at least in part, on the updates to the one or more measurements associated with the first time period. It should be understood, however, that this is merely an example implementation and that claimed subject matter is not limited to this particular implementation.

BRIEF DESCRIPTION OF THE FIGURES

Non-limiting and non-exhaustive features will be described with reference to the following figures, wherein like reference numerals refer to like parts throughout the various figures.

DETAILED DESCRIPTION

Figure 1:
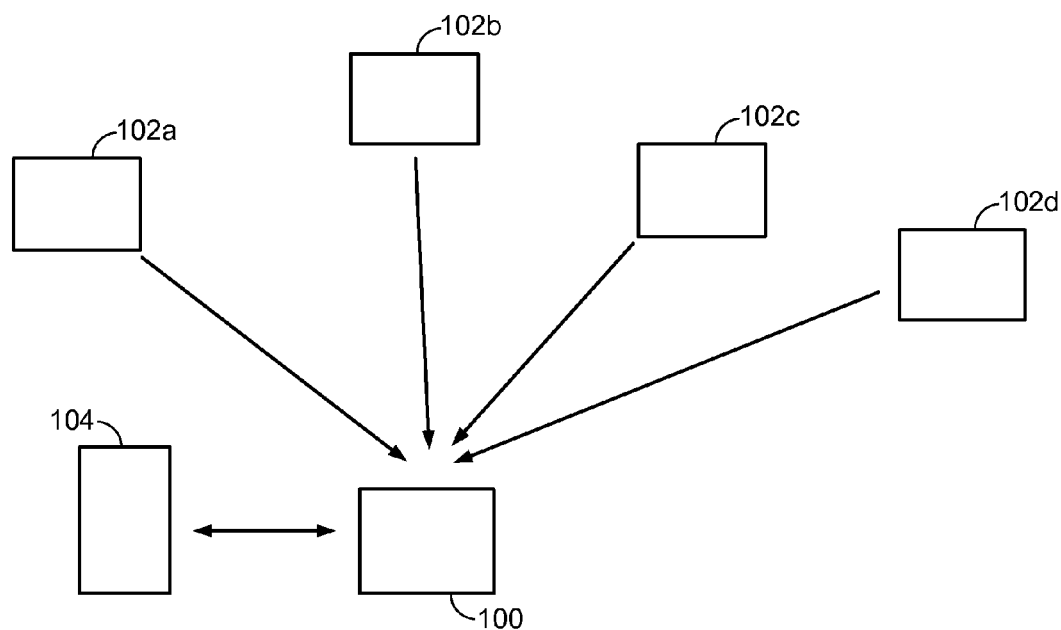
FIG. 1 illustrates an application of a satellite positioning system, according to an implementation.

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on space vehicles such as Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A mobile station (MS), such as a cellular telephone, a personal digital assistant (PDA), and/or a wireless computer, just to name a few examples, may include a capability to determine its position using received SPS signals, such as provided by GNSS and/or other position location systems. In addition to an ability to receive signals from SVs of an SPS, an entity such as an MS may communicate with a wireless network, operated by a wireless service provider, for example, to request information and other resources. Such communication between an MS and a wireless network may be facilitated through any number of cellular base stations, cell towers, and/or transmitters, just to name a few examples. Each such base station, cell tower, and/or transmitter may provide communication for a respective coverage area or cell, for example. The term "cell" may refer to a transmitter and/or its coverage area. The term "transmitter" as used herein may refer to, just to name a few examples, a transmission device located with a base station, a femtocell, a wireless access point, such as a Wi-Fi access point, a Bluetooth device, a television transmitter, and/or a radio station, such as for the FM band. Communication between a wireless network and an MS may involve determining a location fix of the MS operating within the network: data received from the network may be beneficial or otherwise desired for such a location determination. An MS may communicate with and/or receive signals from land-based transceivers such as Wi-Fi, RFID, and Bluetooth, just to name a few examples. However, these are merely examples of data exchange between an MS and a network, and claimed subject matter in not limited in these respects.

In an implementation, an MS may determine one or more measurements based at least in part on collected information during various cycles of its operation. Such measurements may be used in one or more estimation and/or prediction models to estimate and/or predict a state of the MS. The MS may then re-calculate and/or re-determine at least a portion of the one or more measurements based at least in part on received new, additional information in order to re-estimate and/or re-predict a state of the MS.

In addition, the MS may determine additional measurements as a result of receiving new, additional information. For example, an MS may receive enough information from SPS signals to detect a code phase, but such information may be insufficient for a navigation solution due to missing time or ephemeris data. Subsequently receiving such data may allow the information to be usable. Subsequently receiving additional information, such as ephemeris data, may enable removal of such an ambiguity. In another example, multiple correlation peaks may be detected during a coherent integration interval to detect a code phase of a received SPS signal. Additional information may be needed, however, to select a correlation peak to represent a detected code phase. Accordingly, subsequently received information may enable selection of such a correlation peak to represent a code phase.

In a particular implementation, an MS may store and process information obtained in a first time period to obtain one or more measurements associated with the first time period. Such information may comprise any combination or subset of, for example, position (e.g., latitude, longitude, altitude); position uncertainty (e.g., error ellipse, Horizontal Estimated Probability of Error (HEPE)); velocity (e.g., speed, heading, vertical velocity); velocity uncertainty; time (e.g. absolute time stamp of position); time uncertainty; acceleration (e.g., in horizontal and vertical directions); and signal parameters such as signal-to-noise ratio, which may be an indication of an environment category (e.g., outdoor/indoor). Such information may be provided by SPS signals from SVs, signals from one or more base stations, and/or signals from other land-based transmitters. Such an MS may estimate and/or predict a state following the first time period based, at least in part, on the one or more measurements. Such a state may comprise a position and/or trajectory of the MS, for example. In a particular implementation, an MS may estimate and/or predict a state using a Kalman filter. As time elapses, such an MS may obtain additional information subsequent to the first time period. For example, such additional information may comprise ephemeris data received from a location server. Using such additional information, an MS may re-process at least a portion of stored information obtained in the first time period to obtain updates to the one or more measurements associated with the first time period. Such updated measurements may be more accurate and/or complete compared to measurements based only on less complete information from the first time period, as explained in detail below. Using such updated measurements, an MS may re-estimate and/or re-predict a state associated with the MS to provide real-time navigation solutions, which may include a position fix of the MS. Such a position fix may provide geographic information, such as latitude and longitude, a geographical map, and/or any information that may convey a location and/or position of an MS. A position fix may include relative location information such as a set off, wherein a location of a receiver or device, for example, may be provided in relation to another location. Such a set off may indicate a location of a receiver or device relative to a location of a landmark, a region, a marketplace, a cellular tower and/or transmitter, an airport, a second mobile station, and a previous location fix, just to name a few examples.

FIG. 1 illustrates an application of an SPS, according to an implementation. An MS 100 in a wireless communications system receives transmissions from transmitters such as satellites 102a, 102b, 102c, 102d in the line of sight to MS 100, and derives time measurements from four or more of the transmissions. MS 100 may provide such measurements to location server 104, which may include a position determination entity (PDE), for example. Such a location server may determine a location of a station from the measurements. Alternatively, MS 100 may determine its own location from this information. Location server 104 may comprise a computing platform, such as a special purpose computing platform and/or executable code that may be processed and executed by a computing platform, such as a special purpose computing platform. Of course, such an SPS is merely an example of a positioning system, and claimed subject matter is not so limited.

Figure 2:
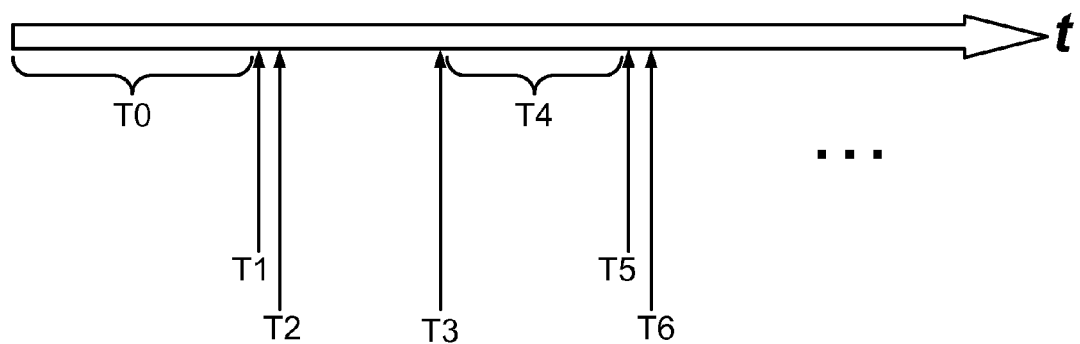
FIG. 2 is a diagram showing a timeline involving a process to estimate and/or predict states of a system, according to an implementation.

FIG. 2 is a schematic diagram showing a timeline involving obtaining and processing information to estimate and/or predict states of a system, according to an implementation. As discussed above, an MS may receive signals from transmitters located at SVs and/or terrestrial locations such as base stations, and/or other land-based devices, for example, during a first time period T0. Such signals acquired from one or more reference stations may include information that an MS may use to determine one or more pseudoranges, Doppler information, SPS time, and/or ephemeris data for SPS SVs, for example. In a particular implementation, an MS may store such information in a memory for later use, as explained below. At time T1, the MS may decode and/or process such signals into measurements. For example, an MS may process one or more received SPS signals to detect a code phase using well known techniques. Such code phase detections may then be used to obtain pseudorange measurements. Of course, such decoding and/or processing may occur during first time period T0 as signals are received. In such a case, an MS may receive and subsequently decode and/or process such signals on-the-fly, or from time to time. However, claimed subject matter is not limited to such examples. Measurements, such as measurements associated with the first time period, may be displayed on a suitable display device. At time T2, after at least a portion of received signals are decoded and/or processed into measurements associated with the first time period, a state of the MS may be estimated and/or predicted by using the received information and/or measurements in appropriate models that may include a Kalman filter. In other words, received information and/or measurements associated with the first time period may be applied to a prediction model to predict a position state of the MS. As mentioned above, such a state may comprise a position and/or trajectory of the MS, for example.

At time T3, after some time elapses, additional information may become available to the MS. In one example, an additional SV may come into view of an MS, thus providing additional information that provides additional pseudorange measurements, carrier phase measurements, a more accurate SPS time, and/or Satellite Based Augmentation System (SBAS) correction information, for example. In a second example, such an additional SV may become viewable by an MS due to a changing Radio Frequency (RF) environment, such as if the MS is moved from indoors to outdoors. In a third example, signals from base stations and/or other land-based transmitters may become receivable due to a changing RF environment or a distance change to an MS. Such signals may provide SV ephemeris data, for example. Of course, such reasons of how additional information may become available to an MS are merely examples, and claimed subject matter is not so limited. Consequent to one or more such events that occur at time T3, the MS, such as through a receiver to receive RF signals, may receive signals comprising additional information during a second time period T4, for example, responsive at least in part to a changing RF environment. Inertial Navigation System (INS) signals may also represent additional information. At time T5, such signals may then be decoded and/or processed by the MS to provide additional measurements, as described above for example. Of course, such decoding and/or processing may occur during second time period T4 as signals are received. In such a case, an MS may receive and subsequently decode and/or process such signals on-the-fly, or from time to time, as described above for first time period T0. However, claimed subject matter is not limited to such examples. The additional information may also be used to provide additional measurements based at least in part on stored information received during T0. For example, additional information acquired during T4 may be combined with information received during T0 to provide measurements that were not available prior to T4. As another example, additional information acquired during T4 may be combined with information received during T0 to improve accuracy of measurements performed during T1 by enabling a determination and/or selection of poor quality information acquired during T0, such as noise and outliers, to be discarded. In this context, the term "outlier" refers to data comprising a data value that is spurious and/or relatively far-removed from its neighboring data, such as a spike in the data. At time T6, after at least a portion of the additional signals are decoded and/or processed into additional measurements, the position state of the MS that was estimated and/or predicted at time T2 may be re-estimated and/or re-predicted using the additional measurements to determine a state in a navigation system. In other words, additional measurements acquired after the first time period may be used to re-estimate and/or re-predict a state of the MS originally predicted using measurements associated with time T1. Such a process may be used in conjunction with a Kalman filter to improve such state predictions and/or estimates by using additional information to statistically improve older information and/or measurements or to provide new information and/or new measurements unavailable before time T3, for example.

Figure 3:
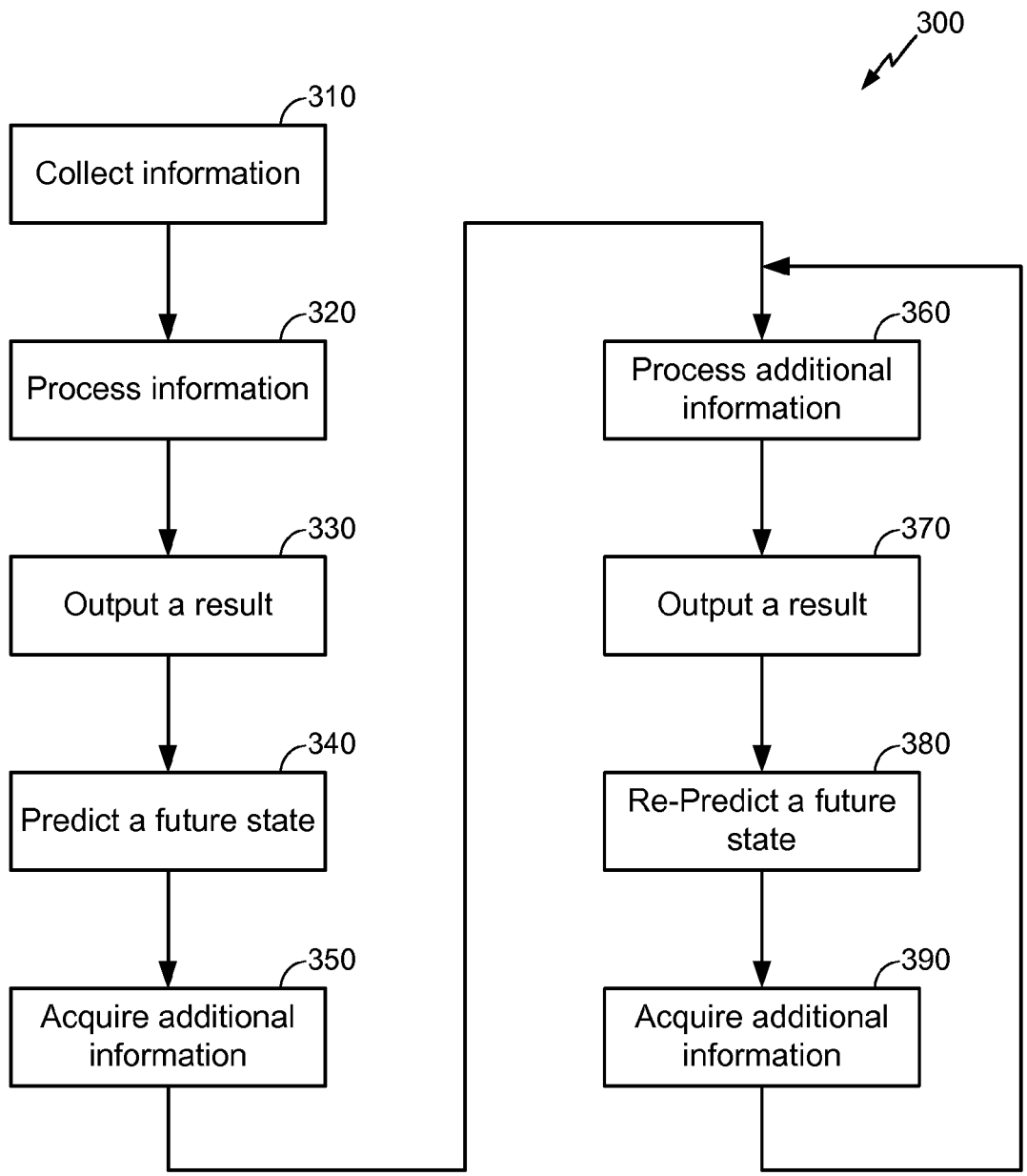
FIG. 3 is a flow diagram showing a process to estimate and/or predict a state of a system, according to an implementation.

FIG. 3 is a flow diagram showing a process 300 to estimate and/or predict a state of a system, according to an implementation. At block 310, an MS may receive signals from SVs, base stations, and/or other land-based beacons, for example, during a first time period. At block 320, the MS may then decode and/or process such signals into measurements. At block 330, after at least a portion of received signals are decoded and/or processed into measurements associated with the first time period, a result of a position determination may be output to a display visible to a user, for example. At block 340, such a result and/or measurements may be used to predict and/or estimate a state of the MS. As mentioned above, such a state may comprise a position and/or trajectory of the MS, for example. At block 350, after some time elapses, additional information may become available to the MS, as described above. At block 360, such additional information may then be decoded and/or processed by the MS to provide additional measurements. For example, additional information acquired during block 350 may be combined with information received during block 310 to provide measurements that were not available prior to block 350. At block 370, a determination of a position may be displayed or otherwise output. At block 380, the state of the MS that was estimated and/or predicted at block 340 may be re-estimated and/or re-predicted using the additional measurements. In other words, additional measurements acquired after a first time period may be used in an algorithm to re-predict the position state of the MS originally predicted using measurements associated with the first time period. Such a process may be used in conjunction with a Kalman filter to improve such state predictions and/or estimates by using additional measurements to statistically improve older measurements and/or to provide new measurements unavailable until some time after the first time period, for example. Continuing with process 300, at block 390 new additional information may become available, so that re-processing measurements using the new additional information may be used to once again re-predict a state, as in blocks 360 through 380, that may provide a navigation solution. Such an iterative process cycle may repeat one or more times, for example, though claimed subject matter is not so limited.

In one particular implementation, a state or a real-time navigation solution, such as one resulting from process 300 described above, may be provided to a map matching (MM) algorithm. Such an algorithm may involve values that represent a history of position and velocity of an MS compared to a road network around the estimated MS position. The location of the MS may then be placed on the most probable road, for example. Accordingly, an MM algorithm may use a real-time navigation solution in addition to stored information to enable a trajectory determination process. For example, additional information, comprising SV ephemerides received at a later time, may be retroactively applied to stored SPS measurements associated with an earlier time. Such a process may lead to an MS trajectory to be used in a map matching algorithm.

In another particular implementation, a process to determine a real-time navigation solution, such as process 300 described above, may include identifying suspect measurements, e.g., measurements that appear erroneous. Such measurements may result from spurious noise in substantially any portion of a navigation system, for example. If such suspect measurements are identified, they may be partitioned from remaining measurements and evaluated later when position information, which may be used to determine what to do with suspect measurements, becomes available. For example, if a measurement had been added to an average value, but is later determined to be faulty, it may be subtracted back out of the averaging process. Conversely, a "suspect" measurement may be set aside without applying it to a process, but later added if later recognized as valid in light of newer measurements and/or additional measurements.

In still another particular implementation, a process to determine a real-time navigation solution, such as process 300 described above, may include amending recorded and/or stored data, such as stored position information. For example, navigation parameters may be stored in a file in an MS, to be downloaded later by a user. In such a case, such files may be amended based at least in part on new measurements and/or additional information.

In still another particular implementation, a process to determine a real-time navigation solution, such as process 300 described above, may include processing Inertial Navigation System (INS)/SPS data that is collected before INS initialization by an MS. The MS may include an Inertial Measurement Unit (IMU) that may comprise one or more on-board accelerometers, gyros, and/or compasses, for example, to provide such INS data, for example, position and/or velocity measurements. After INS initialization, an orientation of the MS measured by the IMU may be tracked back to a start time so that INS/SPS data may be processed from the start time to the present, for example. Such a process may provide navigation results up to the present, which may be useful, but more importantly such results may provide potentially improved estimates of navigation states.

In still another particular implementation, a process to determine a real-time navigation solution, such as process 300 described above, may include processing INS data before a first available SPS fix. For example, if SPS pseudoranges, time, and/or ephemeris are not (sufficiently) available to an MS, a navigation solution may not be determinable until a first SPS fix is acquired, even if INS data are available. However, it may be possible to obtain a navigation solution by computing INS-based results backwards in time from the first full SPS/INS solution. Such a process may be called "backwards" dead reckoning.

In yet another particular implementation, a process to determine a real-time navigation solution, such as process 300 described above, may include a static-dynamic mode transition. For example, in SPS-only processing, recognition of the end of a static period (during which an MS is not substantially moving) may be delayed by several seconds if a static position hold algorithm is applied. Backward propagation from a first detected non-static point (using stored measurements) may detect the last actual static point with improved reliability. Accordingly, processing forward from such a first detected non-static point (with a corrected static-dynamic switch) may provide an improved navigation solution.

In still another particular implementation, in a real-time navigation solution, such as pedestrian navigation for example, calibration values of some sensors (compass, accelerometer, and so on) may not be available at the beginning of a navigation period. Such calibration values may be available only after a sufficient number of measurements become available, for example. Accordingly, a navigation solution, lacking a sufficient number of measurements, may have an inferior quality or may not be available in some particular cases. If, however, a sufficient number of measurements are obtained, sufficient sensor calibration may be performed. Past measurements at this point may be re-processed using newly obtained calibration results, thereby providing values for an improved navigation solution for the past time period as well as present and/or future time periods.

Figure 4:
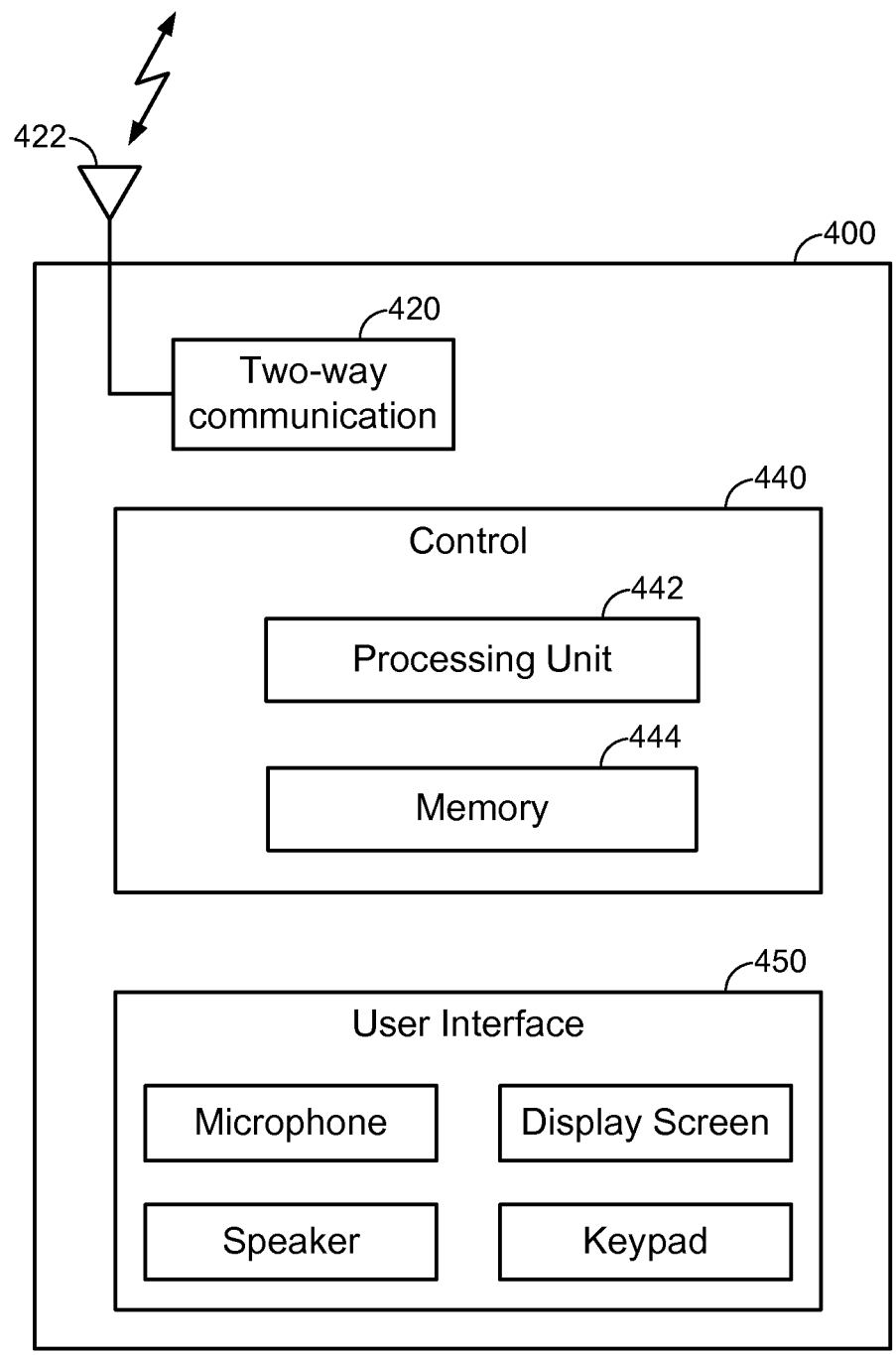
FIG. 4 is a schematic diagram of a device capable of communication with a wireless network, according to one implementation.

FIG. 4 is a schematic diagram of a device 400 capable of communication with a wireless network, according to one implementation. Such a device may include an MS, such as MS 100 shown in FIG. 1, for example. Device 400 may include a two-way communication system 420, such as but not limited to a cellular communication system, which may transmit and receive signals via antenna 422. The communication system 420 may include a modem adapted to process information for communication in one or more of the aforementioned networks. In one alternative implementation, device 400 may include a position location system, such as an SPS receiver to receive SPS signals. The modem and SPS receiver may communicate with one another, and such communication may include, for example, the cellular identification of the device, estimates of time and/or location, frequency, or other radio information. In another implementation, device 400 may not include a position location system, so that the device lacks any inherent ability to acquire SPS signals.

Mobile control 440 may comprise a special purpose computing platform, such as processing unit 442 and associated memory 444, hardware, software, and firmware. It will be understood as used herein that processing unit 442 can, but need not necessarily include, one or more microprocessors, embedded processors, controllers, application specific integrated circuits (ASICs), digital signal processors (DSPs), and the like. In an alternative implementation memory 444 may include a look-up table. Memory 444 may store machine-readable instructions which, if executed by processing unit 442, may enable device 400 to determine its location, as in at least the implementations described above. Such machine-readable instructions may be downloaded, e.g., received via two-way communication 420, from a remote entity such as a wireless carrier, for example. Machine-readable instructions may include an application that allows device 400 to identify and extract identification information of a cellular base station included in a pilot signal. Such an application may also include a look-up table of cellular base station information for a region or the world. Machine-readable instructions may also include a Kalman filter, as described above. Of course, claimed subject matter is not limited to these examples, which are only described here to help illustrate various implementations. Memory 444 may comprise one or more types of storage media. A user interface 450 may allow a user to enter information into and receive information, such as voice or data, from device 400. The user interface 450 may include, for example, a keypad, a display screen, a microphone, and a speaker.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented by one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Some portions of the detailed description above are presented in terms of algorithms or symbolic representations of operations stored within a memory of a specific apparatus or special purpose computing device or platform. In the context of this particular specification, the term specific apparatus, special purpose computing platform, special purpose computing device, special purpose electronic computing device, or the like includes a general purpose computer/processing unit programmed to perform particular functions pursuant to instructions from program software/code. Algorithmic descriptions or symbolic representations are examples of techniques used by those of ordinary skill in the signal processing or related arts to convey the substance of their work to others skilled in the art. An algorithm as here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a machine/computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

As described above, a satellite positioning system (SPS) typically comprises a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites. For example, a satellite in a constellation of a present or future Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from an SPS satellite, a receiver may form multiple pseudorange hypotheses. For example, before GPS bit synchronization is performed for a channel, there may be 20 possible pseudorange candidates with a 1 millisecond increment. Tracking and/or processing GPS signals from this SV, or using other information, may allow a reduction of the number of candidates to just one. Alternatively, additional information may lead to elimination of pseudorange hypotheses if a signal acquisition was proved to be false. In other words, using additional information, a receiver may eliminate such pseudorange hypotheses to, in effect, reduce an ambiguity associated with a true pseudorange measurement. With sufficient accuracy in knowledge of timing of a signal received from an SPS satellite, some or all false pseudorange hypotheses may be eliminated.

A "satellite vehicle" (SV) as referred to herein relates to, for example, an object that is capable of transmitting signals to receivers on the Earth's surface. In one particular example, such an SV may comprise a geostationary satellite. Alternatively, an SV may comprise a satellite traveling in an orbit and moving relative to a stationary location on the Earth. However, these are merely examples of SVs and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), to name just a few radio technologies. Here, CDMA2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x network, for example. Such location determination techniques described herein may also be used for any combination of WWAN, WLAN and/or WPAN.

Techniques described herein may be used with any one of several SPS satellites and/or combinations of SPS satellites. Furthermore, such techniques may be used with location determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others. The term "SPS signals", as used herein, is intended to include signals from pseudolites or equivalents of pseudolites.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:
1. A mobile device comprising:
a receiver to receive RF signals;
a memory; and
a special purpose computing device adapted to operate in an RF environment to:
process information, represented by first signals, obtained in a first time period to obtain one or more measurements associated with said first time period;
store unprocessed information obtained in said first time period;

compute an estimate and/or a prediction of a state following said first time period based, at least in part, on said one or more measurements, wherein said state comprises a position and/or trajectory;

obtain additional information, represented by second signals, subsequent to said first time period;

re-process at least a portion of said stored unprocessed information obtained in said first time period combined with said additional information obtained subsequent to said first time period to obtain updates to said one or more measurements associated with said first time period; and re-compute said estimate and/or prediction of said state that was estimated and/or predicted based on the one or more measurements obtained in the first time period based, at least in part, on said updates obtained by the re-processing of the stored unprocessed information obtained in said first time period combined with said additional information obtained subsequent to said first time period.

2. The mobile device of claim 1, wherein said computing device is further adapted to determine a real-time navigation solution based at least in part on said re-computed estimate and/or prediction of said state.

3. The mobile device of claim 1, further comprising a Kalman filter.

4. The mobile device of claim 1, wherein said computing device is further adapted to obtain said additional information responsive at least in part to a changing RF environment.

5. The mobile device of claim 1, wherein said additional information provides data to measure one or more pseudoranges.

6. The mobile device of claim 5, wherein said one or more pseudoranges are associated with one or more space vehicles.

7. The mobile device of claim 5, wherein said one or more pseudorange measurements are associated with one or more base stations.

8. The mobile device of claim 1, wherein said additional information comprises a wireless system time.

9. The mobile device of claim 1, wherein said additional information comprises ephemeris data associated with one or more space vehicles.

10. The mobile device of claim 1, wherein said additional information comprises Satellite Based Augmentation System (SBAS) correction information.

11. The mobile device of claim 1, wherein said information obtained in said first time period comprises pseudorange and/or Doppler information acquired from one or more reference stations.

12. The mobile device of claim 1, further comprising an accelerometer, gyro, and/or compass.

13. An apparatus comprising:
means for processing information, represented by first signals, obtained in a first time period to obtain one or more measurements associated with said first time period;
means for storing unprocessed information obtained in said first time period;
means for estimating and/or predicting a state following said first time period based, at least in part, on said one or more measurements associated with said first time period, wherein said state comprises a position and/or trajectory;
means for obtaining additional information, represented by second signals, subsequent to said first time period;
means for re-processing at least a portion of said stored unprocessed information obtained in said first time period combined with said additional information obtained subsequent to said first time period to obtain updates to said one or more measurements associated with said first time period; and
means for re-estimating and/or re-predicting said state that was estimated and/or predicted based on the one or more measurements obtained in the first time period based, at least in part, on said updates obtained by the re-processing of the stored unprocessed information obtained in said first time period combined with said additional information obtained subsequent to said first time period.

14. The apparatus of claim 13, wherein said estimating and/or predicting a state is performed using a Kalman filter.

15. The apparatus of claim 13, further comprising:
means for determining a real-time navigation solution based at least in part on said re-estimated and/or re-predicted state.

16. The apparatus of claim 13, wherein said means for obtaining additional information further comprises means for obtaining signals representing said additional information responsive at least in part to a changing RF environment.

17. The apparatus of claim 13, wherein said additional information provides data to measure one or more pseudoranges.

18. The apparatus of claim 17, wherein said one or more pseudoranges are associated with one or more space vehicles.

19. The apparatus of claim 13, wherein said additional information comprises a wireless system time.

20. The apparatus of claim 13, wherein said additional information comprises ephemeris data associated with one or more space vehicles.

21. A computer readable storage medium comprising machine-readable instructions stored thereon which, if executed by a special purpose computing device, are adapted to enable said special purpose computing device to:
process information, represented by first signals, obtained in a first time period to obtain one or more measurements associated with said first time period;
store unprocessed information obtained in said first time period;
estimate and/or predict a state following said first time period based, at least in part, on said one or more measurements associated with said first time period, wherein said state comprises a position and/or trajectory;
obtain additional information, represented by second signals, subsequent to said first time period;
re-process at least a portion of said stored unprocessed information obtained in said first time period combined with said additional information obtained subsequent to said first time period to obtain updates to said one or more measurements associated with said first time period; and
re-estimate and/or re-predict said state that was estimated and/or predicted based on the one or more measurements obtained in the first time period based, at least in part, on said updates obtained by the re-processing of the stored information obtained in said first time period combined with said additional information obtained subsequent to said first time period.

22. The article of claim 21, wherein said machine-readable instructions are further adapted to enable said special purpose computing device to estimate and/or predict said state using a Kalman filter.

23. The article of claim 21, wherein said machine-readable instructions are further adapted to enable said special purpose computing device to obtain said additional information responsive at least in part to a changing RF environment.

24. The article of claim 21, wherein said additional information provides data to measure one or more pseudoranges.

25. The article of claim 24, wherein said one or more pseudoranges are associated with one or more space vehicles.

26. The article of claim 21, wherein said additional information comprises a wireless system time.

27. The article of claim 21, wherein said additional information comprises ephemeris data associated with one or more space vehicles.

28. A method comprising:
processing, at a device, wirelessly received signals representing information obtained in a first time period to obtain one or more measurements associated with said first time period, wherein said wirelessly received signals representing the information obtained in said first time period are stored in the device's memory;
obtaining, at the device, additional wirelessly received signals representing additional information subsequent to said first time period;
re-processing, at the device, at least a portion of said stored unprocessed wirelessly received signals representing said information obtained in said first time period combined with said additional information represented by the additional wirelessly received signals to obtain updates to said one or more measurements associated with said first time period and to re-predict with the updates to the one or more measurements obtained from the wirelessly received signals and the additional wirelessly received signals a first state that was predicted earlier with the one or more measurements obtained based only on the wirelessly received signals representing the information obtained at the first time period;
estimating and/or predicting, at the device, the first state based, at least in part, on said updates to said one or more measurements associated with said first time period obtained by the re-processing of the stored unprocessed information obtained in said first time period combined with said additional information obtained subsequent to said first time period, wherein said first state comprises a position and/or trajectory; and
applying, at the device, said first state to a map matching algorithm.

29. The method of claim 28, wherein said estimating and/or predicting a state is performed using a Kalman filter.

30. The method of claim 28, wherein obtaining signals representing additional information further comprises obtaining said signals representing said additional information responsive at least in part to a changing RF environment.

31. The method of claim 28, wherein said additional information provides data to measure one or more pseudoranges.

32. A method comprising:
processing, at a device, wirelessly received signals representing information obtained in a first time period to obtain one or more measurements associated with said first time period, wherein said wirelessly received signals representing the information obtained in said first time period are stored in the device's memory;
obtaining, at the device, inertial navigation system (INS) signals representing additional information subsequent to said first time period;
re-processing, at the device, at least a portion of said stored unprocessed wirelessly received signals representing said information obtained in said first time period combined with said additional information represented by the INS signals to obtain updates to said one or more measurements associated with said first time period; and
estimating and/or predicting, at the device, a state based, at least in part, on said updates to said one or more measurements associated with said first time period obtained by the re-processing of the stored unprocessed information obtained in said first time period combined with said additional information obtained subsequent to said first time period, wherein said state comprises a position and/or trajectory.

33. The method of claim 32, wherein said estimating and/or predicting a state is performed using a Kalman filter.

34. The method of claim 32, wherein said INS signals are based, at least in part, on an accelerometer, a gyro, and/or a compass.

35. A method comprising:
storing in memory of a device wirelessly received signals representing information obtained in a first time period;
processing, at the device, the wirelessly received signals representing the information obtained in the first time period to obtain one or more measurements associated with said first time period;
estimating and/or predicting, at the device, a state following said first time period based, at least in part, on said one or more measurements associated with said first time period, wherein said state comprises a position and/or trajectory;
obtaining, at the device, additional wirelessly received signals representing additional information subsequent to said first time period;
re-processing, at the device, at least a portion of said unprocessed stored wirelessly received signals representing said information obtained in said first time period combined with said additional information represented by the additional wirelessly received signals to obtain updates to said one or more measurements associated with said first time period and to re-predict with the updates to the one or more measurements obtained from the wirelessly received signals and the additional wirelessly received signals the first state that was predicted earlier with the one or more measurements obtained based only on the wirelessly received signals representing the information obtained at the first time period; and
re-estimating and/or re-predicting, at the device, said state based, at least in part, on said updates to said one or more measurements associated with said first time period.

36. The method of claim 35, wherein said estimating and/or predicting a state is performed using a Kalman filter.

37. The method of claim 35, further comprising:
determining a real-time navigation solution based at least in part on said re-estimated and/or re-predicted state.

38. The method of claim 35, wherein said obtaining additional information is responsive at least in part to a changing RF environment.

39. The method of claim 35, wherein said additional information provides data to measure one or more pseudorange measurements.

40. The method of claim 39, wherein said one or more pseudorange measurements are associated with one or more space vehicles.

41. The method of claim 39, wherein said one or more pseudoranges are associated with one or more base stations.

42. The method of claim 35, wherein said additional information comprises a wireless system time.

43. The method of claim 35, wherein said additional information comprises ephemeris data associated with one or more space vehicles.

44. The method of claim 35, wherein said additional information comprises Satellite Based Augmentation System (SBAS) correction information.

45. The method of claim 35, wherein said information obtained in said first time period comprises pseudorange and/or Doppler information acquired from one or more reference stations.

46. The method of claim 35, wherein said information obtained in said first time period comprises position and/or velocity measurements acquired from an accelerometer, gyro, and/or compass on-board a mobile station.

47. The method of claim 35, further comprising:
comparing said position and/or trajectory with a model of a road network to determine a location with respect to said road network.

48. The method of claim 35, wherein said information obtained in said first time period comprises one or more pseudorange measurements.

49. The method of claim 48, wherein said one or more pseudorange measurements are associated with one or more space vehicles.

50. The method of claim 48, wherein said one or more pseudorange measurements are associated with one or more base stations.

51. The method of claim 35, wherein said information obtained in said first time period comprises ephemeris data associated with one or more space vehicles.

52. The method of claim 35, further comprising:
displaying said one or more measurements during said first time period.

53. The method of claim 35, wherein said updates to said one or more measurements comprise one or more additional measurements.

* * * * *